United States Patent
Avital

(10) Patent No.: US 9,547,763 B1
(45) Date of Patent: Jan. 17, 2017

(54) AUTHENTICATION USING FACIAL RECOGNITION

(71) Applicant: EMC Corporation, Hopkinton, MA (US)

(72) Inventor: Aviv Avital, Be'er Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/674,347

(22) Filed: Mar. 31, 2015

(51) Int. Cl.
G06F 21/36 (2013.01)
H04L 29/06 (2006.01)
G06K 9/00 (2006.01)

(52) U.S. Cl.
CPC ........... *G06F 21/36* (2013.01); *G06K 9/00288* (2013.01); *G06K 9/00315* (2013.01); *H04L 63/0861* (2013.01)

(58) Field of Classification Search
CPC ...................................................... G06F 21/36
See application file for complete search history.

(56) References Cited

U.S. PATENT DOCUMENTS

| 7,684,651 | B2 * | 3/2010 | Tang ................. G06F 17/30247 382/115 |
| 7,917,508 | B1 * | 3/2011 | Baluja ............... G06F 17/30265 707/736 |
| 8,091,120 | B2 | 1/2012 | Perrella et al. |
| 8,621,586 | B1 | 12/2013 | Peer et al. |
| 8,627,421 | B1 * | 1/2014 | Bowers ................. H04L 9/3226 726/5 |
| 8,646,060 | B1 | 2/2014 | Ben Ayed |
| 8,752,145 | B1 | 6/2014 | Dotan et al. |
| 8,832,790 | B1 | 9/2014 | Villa et al. |
| 8,856,923 | B1 | 10/2014 | Kolman et al. |
| 8,875,267 | B1 | 10/2014 | Kolman et al. |
| 8,902,045 | B1 | 12/2014 | Linn et al. |
| 8,904,493 | B1 * | 12/2014 | Dibble .................... H04L 63/08 726/4 |
| 8,973,096 | B1 | 3/2015 | Villa et al. |
| 9,078,129 | B1 | 7/2015 | Dotan et al. |

(Continued)

OTHER PUBLICATIONS

Rui, Yong; Liu, Zicheng; "ARTiFACIAL: Automated Reverse Turing test using Facial features", Multimedia Systems, vol. 9, Issue 6, Springer, Jun. 2004, pp. 493-502.*

(Continued)

*Primary Examiner* — Victor Lesniewski
(74) *Attorney, Agent, or Firm* — BainwoodHuang

(57) ABSTRACT

A method includes (a) receiving an authentication request from a user seeking access to a protected resource, (b) in response, generating a set of one or more face images, each face image having a facial expression score for a particular emotion associated with that face image, the facial expression scores being specific to the user, (c) displaying each face image of the set to the user together with a request for the user to score that face image for the particular emotion associated with that face image, (d) in response, receiving a user score for that face image, (e) comparing the received user score for each face image of the set to the respective facial expression score for the particular emotion associated with that face image, yielding a set of results, and (f) selectively providing access to the protected resource in response to each of the results being affirmative.

12 Claims, 6 Drawing Sheets

(56) References Cited

U.S. PATENT DOCUMENTS

| | | | | |
|---|---|---|---|---|
| 2008/0066014 | A1* | 3/2008 | Misra | G06F 21/36 715/846 |
| 2008/0260212 | A1* | 10/2008 | Moskal | A61B 5/1079 382/118 |
| 2010/0095371 | A1* | 4/2010 | Rubin | H04L 9/32 726/18 |
| 2013/0036461 | A1* | 2/2013 | Lowry | G06F 21/36 726/19 |
| 2015/0324352 | A1* | 11/2015 | Meyer | G06F 17/28 382/103 |

OTHER PUBLICATIONS

Powell, Brian M.; Goswami, Gaurav; Vatsa, Mayank; Singh, Richa; Noore Afzel; "fgCAPTCHA: Genetically Optimized Face Image Captcha", IEEE Access, vol. 2, Apr. 29, 2014, pp. 473-484.*

Goswami, Gaurav; Singh, Richa; Vatsa, Mayank; Powell, Brian; Noore, Afzel; "Face Recognition CAPTCHA", Fifth International Conference on Biometrics: Theory, Applications and Systems, IEEE, Sep. 23-27, 2012, pp. 412-417.*

Reynaga, Gerardo; Chiasson, Sonia; "The Usability of CAPTCHAs on Smartphones", International Conference on Security and Cryptography, IEEE, Jul. 29-31, 2013, pp. 1-8.*

Macias, Cristina Romero; Izquierdo, Ebroul; "Image CAPTCHA based on Distorted Faces", 4th International Conference on Imaging for Crime Detection and Prevention, IET, Nov. 3-4, 2011, pp. 1-6.*

Misra, Deapesh; Gaj, Kris; "Face Recognition CAPTCHAs", Advanced Int'l Conference on Telecommunications and Int'l Conference on Internet Web Applications and Services, IEEE, Feb. 19-25, 2006, 6 pages.*

Ika Bar-Menachem, et al.; "Knowledge Based Authentication Using Mobile Devices"; U.S. Appl. No. 14/098,269, filed Dec. 5, 2013.

Aviv Avital, et al.; "Authenticating a User While the User Operates a Client Apparatus and Possesses an Electronic Card"; U.S. Appl. No. 14/561,640, filed Dec. 5, 2014.

Tamar Wisemon, et al.; "Detecting Mobile Device Emulation"; U.S. Appl. No. 14/565,739, filed Dec. 10, 2014.

Aviv Avital; "Authentication Using Remote Device Locking", U.S. Appl. No. 14/669,554, filed Mar. 26, 2015.

Ekman, et al.; "Facial Signs of Emotional Experience", Journal of Personality and Social Psychology, 1980, vol. 39, No. 6, pp. 1125-1134, American Psychological Association.

Ekman, et al.; "Universals and Cultural Differences in the Judgments of Facial Expressions of Emotion", Journal of Personality and Social Psychology, 1987, vol. 53, No. 4, pp. 712-717, American Psychological Association.

Kanade, et al.; "Comprehensive Database for Facial Expression Analysis", Fourth IEEE International Conference on Automatic Face and Gesture Recognition, 2000, pp. 46-53, IEEE.

Kring, et al.; "The Facial Expression Coding System (Faces): A Users Guide", Unpublished Manuscript, 1991, 14 pages, accessed from <https://socrates.berkeley.edu/~akring/FACES%20manual.pdf> on Mar. 30, 2015.

Pighin, et al.; "Synthesizing Realistic Facial Expressions from Photographs", Annual Conference on Computer Graphics, SIG-GRAPH '98, Jul. 1998, 10 pages, Association for Computing Machinery.

Tamamiya, et al.; "Individual Differences in the Recognition of Facial Expressions: An Event-Related Potentials Study", PLOS One, Feb. 2013, vol. 8, Issue 2, 7 pages.

Flores, Victoria, "Artnatomy: Anatomical Basis of Facial Expression Learning Tool", <http://www.artnatomia.net/uk/>, Jun. 2014, 2 pages, accessed from <https://web.archive.org/web/20140629014634/http://www.artnatomia.net/uk/index.html>.

Ahlberg, J., "Candide—a parameterized face", 3 pages, accessed from <http://www.bk.isy.liu.se/candide/main.html> on May 24, 2012.

* cited by examiner

Neutral Face Model
302

Sadness Facial
Expression Score = 0

Intermediate Face Model
402

Sadness Facial
Expression Score = 5

Reference Sadness
Face Model
502

Sadness Facial
Expression Score = 9

AUTHENTICATION USING FACIAL RECOGNITION

BACKGROUND

Users often desire to sign into remote servers (e.g., to access web mail or online banking). Typically, authentication is performed using a password or a token in order to ensure the user's identity. In some systems, step-up authentication may be used in certain high-risk situations. This step-up authentication typically involves the user sending back a password, a token, or an answer to a question.

SUMMARY

Unfortunately, the above-described conventional systems suffer from deficiencies. For example, since these conventional systems rely on sending something the user knows for authentication, they are susceptible to eavesdropping. Thus, even if the authentication is encrypted, an attacker may be able to learn the user's username, token, or answers to various questions.

Thus, it would be desirable to provide a remote authentication technique for mobile devices that does not rely solely on sending something the user knows. Rather, it would be desirable to utilize a skill that only the user has, since this prevents simple eavesdropping.

This may be accomplished by training a system to recognize facial expression recognition skills of the user and then dynamically generating one or more facial expression that the user is expected to be able to correctly rate. Due to slight variations in the facial expression that only the user would be expected to be able to identify, it is unlikely that an attacker could successfully rate them as the user would be expected to. This skill-based recognition procedure may be done as a step-up form of authentication. Alternatively, the skill-based recognition procedure may be repeated for several different faces as a primary form of authentication.

One embodiment of the improved techniques is directed to a method performed by a computing device of providing access to a protected resource. The method includes (a) receiving, by the computing device, an authentication request from a user seeking access to the protected resource, (b) in response to receiving the authentication request, generating a set of one or more facial expression images, each facial expression image of the set of facial expression images having a facial expression score for a particular emotion associated with that face image, the facial expression scores being specific to the user, (c) displaying each face image of the set of face images to the user together with a request for the user to score that face image for the particular emotion associated with that face image, (d) in response to displaying each face image, receiving a user score for that face image, (e) comparing the received user score for each face image of the set of face images to the respective facial expression score for the particular emotion associated with that face image, yielding a set of comparison results, and (f) selectively providing access to the protected resource in response to each of the comparison results being affirmative. Other embodiments are directed to a system, a computerized apparatus, and a computer program product for performing methods of providing access to a protected resource similar to those described above.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for training a system to recognize facial expression recognition skills of a user and then dynamically generating one or more faces that the user is expected to be able to correctly rate. Due to slight variations in the way facial expressions are interpreted by individuals, it is unlikely that an attacker could successfully rate them as the user would be expected to. This skill-based recognition procedure may be done as a step-up form of authentication. Alternatively, the skill-based recognition procedure may be repeated for several different faces as a primary form of authentication.

Figure 1:
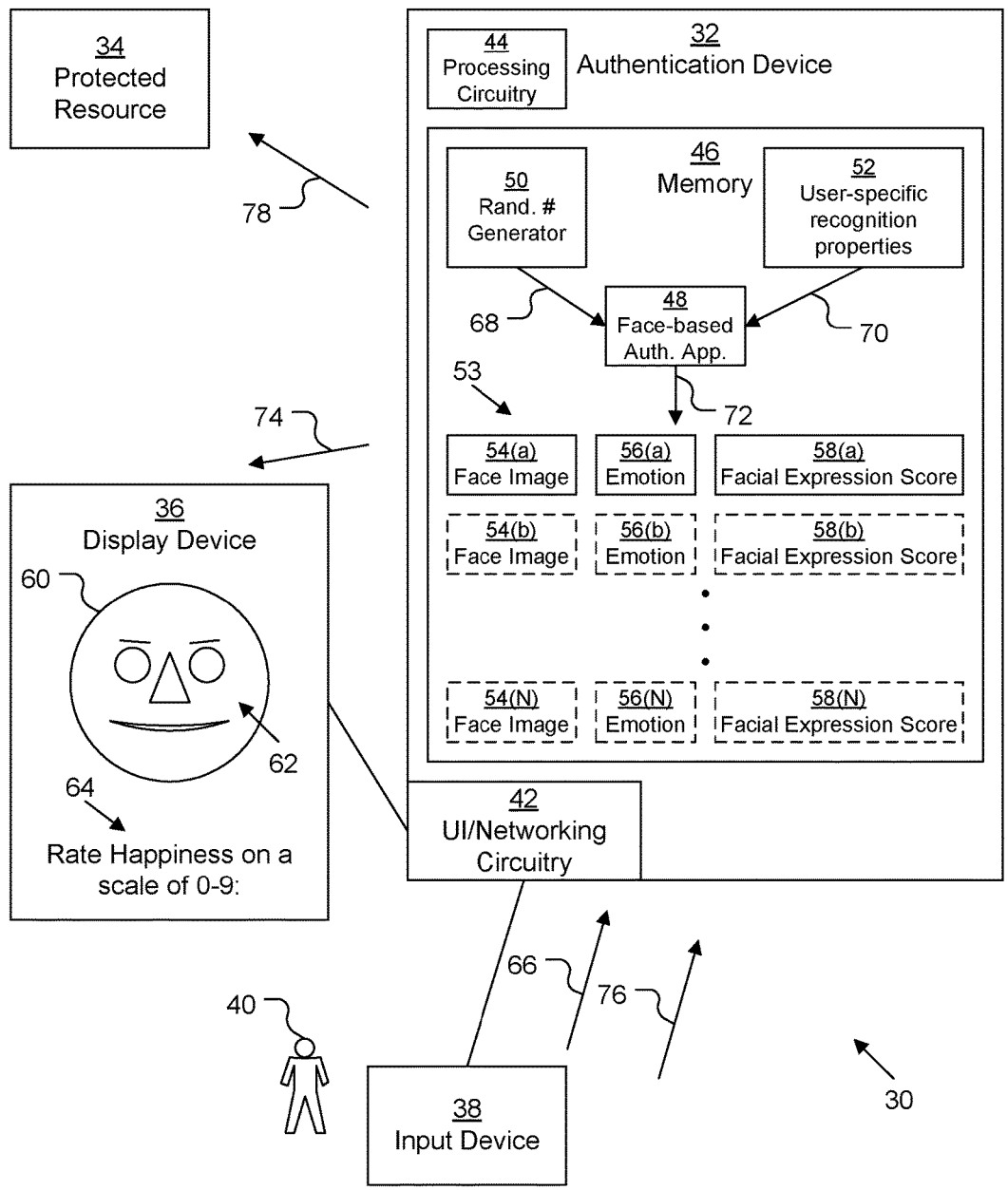
FIG. 1 is a block diagram depicting an example system for use in connection with various embodiments.

FIG. 1 depicts an example system 30 in which improved techniques hereof may be practiced. System 30 includes an authentication device 32 configured to selectively provide a user 40 with access to a protected resource 34. System 30 also includes a display device 36 and an input device 38 communicatively coupled to the authentication device 32.

Authentication device 32 may be any kind of computing device, such as, for example, a personal computer, a workstation, a server, an enterprise server, a smart phone, a tablet computer, a handheld computer, a laptop computer, a smart watch, a wearable computer, etc.

Authentication device 32 includes processing circuitry 44, memory 46, and UI/Networking circuitry 42. Processing circuitry 44 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Memory 46 may be any kind of digital system memory, such as, for example, random access memory (RAM). Memory 46 stores an executing operating system (OS, not depicted) and one or more applications (e.g., face-based authentication application 48, random number generator 50, etc.) executing on processing circuitry 44 as well as data used by those applications (e.g., user-specific recognition properties 52 and a set 53 of face images 54 with corresponding emotions 56 and facial expression scores 58). In some embodiments, memory 54 may also include a persistent storage portion (not depicted). Persistent storage may be made up of one or more persistent storage devices, such as, for example, hard disk drives, solid-state storage devices, flash drives, etc. Persistent storage is configured to store programs and data even while the authentication device 32 is powered off. The OS (e.g., Linux, UNIX, Windows, or a similar operating system) and the applications (e.g., face-based authentication application 48, random number generator 50) are typically stored in persistent storage so that they may be loaded into memory 46 from persistent storage upon a system restart. These applications, when stored in non-transient form either in the volatile portion of memory 46 or in persistent storage, form a computer program product. The processing circuitry 44 running one or more of these applications thus forms a specialized circuit constructed and arranged to carry out the various processes described herein. In some embodiments, the user-specific recognition properties 52 are stored primarily within persistent storage rather than within the volatile portion of memory 46, although portions thereof may be cached in the volatile portion of memory 46 temporarily as needed.

In some embodiments (not depicted), rather than running as an application stored in memory 46, random number generator 50 is made up of specialized hardware circuitry of the authentication device 32.

UI/networking circuitry 42 interfaces with the input device 38 and the display device. In some embodiments, the input device 38 and the display device 36 may be local to the authentication device 32, in which case, the input device 38 and the display device 36 connect via user interface (UI) circuitry (e.g., serial bus, graphics adapter, etc.) of the UI/networking circuitry 42 (see FIG. 2, below). In other embodiments, the input device 38 and the display device 36 may be remote from the authentication device 32, in which case the input device 38 and the display device 36 connect via networking circuitry (e.g., a network adapter, etc.) of the UI/networking circuitry 42. In the latter case, typically the input device 38 and the display device 36 connect to a remote computing device, which, in turn, connects to a network that connects to the networking circuitry of the IA/networking circuitry 42 (see FIG. 3, below).

Protected resource 34 may be any kind of digital resource that a user 40 may wish to access for which access control is desired. For example, the protected resource 34 may be a document, a website (e.g., web mail, online banking, etc.), a database, a server (e.g., a Unix machine), a user account (e.g., a user bank account), etc. Although not depicted explicitly, protected resource 34 may reside on the authentication device 32 or on any other computing device connected to a network accessible to the user 40 (e.g., in the cases in which the protected resource 34 is a document, a website, a database, or an account).

Display device 36 may be any kind of device capable of displaying an image to user 40, such as, for example, an LED, LCD, or CRT monitor or display screen or a printer. Input device 38 may be any kind of device capable of receiving user input from the user 40, such as, for example, a keyboard, a keypad, a mouse, a tracking pad, a tracking stick, a tracking ball, or a microphone used in conjunction with voice-activated control software. In some embodiments, display device 36 and input device 38 may be combined, such as, for example, in a touch-sensitive display screen. In some embodiments, display device 36 and input device 38 (whether combined or not) may be embedded within the authentication device 32 or within a remote computing device in control of the user 40.

Display device 36 is configured to display a face image 60 having a particular facial expression 62 together with an instruction 64 to rate the facial expression for a particular emotion (happiness, as depicted) on a particular scale (e.g., from 0 to 9, as depicted).

In operation, user 40 operates input device 38 to cause an authentication request 66 to be sent to face-based authentication application 48. In response, face-based authentication application 48 creates (see character 72) set 53 of face images 54, each with a facial expression 62 and corresponding emotions 56 and facial expression scores 58 using an output 68 of random number generator 50 and data 70 from the user-specific recognition properties 52 as inputs. Depending on the embodiment, set 53 may contain a single face image 54(a) or it may contain several face images 54(a), 54(b), . . . , 54(N), there being an integer, N, number of elements in the set 53.

In response, upon creating the set 53, face-based authentication application 48 sends a display instruction 74 to display device 36, causing the display device 36 to display the face images 54 of the set 53 as face image 60 on screen. Thus, in one embodiment, a single display instruction 74 is sent for a single face image 54(a), while in another embodiment, several display instructions 74 are sent, one for each of the several face images 54(a), 54(b), . . . , 54(N). Display instruction 74 also includes instruction text 64 based on the emotion 56 corresponding to the face image 54 sent. Thus, as depicted, the depicted face image 60 is a semi-happy face corresponding to an image file of face image 54(a), and emotion 56(a) is happiness, so instruction text 64 asks the user 40 rate the happiness of the face image 60 on a scale from 0 to 9.

Upon viewing the face image 60, the user 40 assesses the facial expression 62 of the face image, and rates it on the scale as directed by the instruction 64, inputting the rating score 76 via input device 38. Thus, the user 40 may rate the happiness of the depicted face image 60 as being a 4 on the scale from 0 to 9, inputting the value "4" as the rating score 76.

The face-based authentication application 48 receives the rating score 76 from the input device 38, and compares it with the pre-calculated facial expression score 58 for the particular facial expression image 54 displayed. Thus, in the example, the face-based authentication application 48 determines whether the rating score 76 of "4" matches the facial expression score 58(a). If it does, then it is likely that the user 40 is the person he is claiming to be, but if it does not, then it is likely that the user 40 is not the person he is claiming to be. In some embodiments, all face images 54(a), 54(b), . . . , 54(N) are displayed (either in sequence or side-by-side), each together with a respective instruction based on its respective emotion 56(a), 56(b), . . . , 56(N), and only if all of the received rating scores 76 match the respective facial expression scores 58(a), 58(b), . . . , 58(N), is it determined that the user 40 is who he is claiming to be. In response, the authentication device 32 may communicate an access result 78 to protected resource 34 indicating whether the user 40 is permitted to access the protected resource 34.

Figure 2:
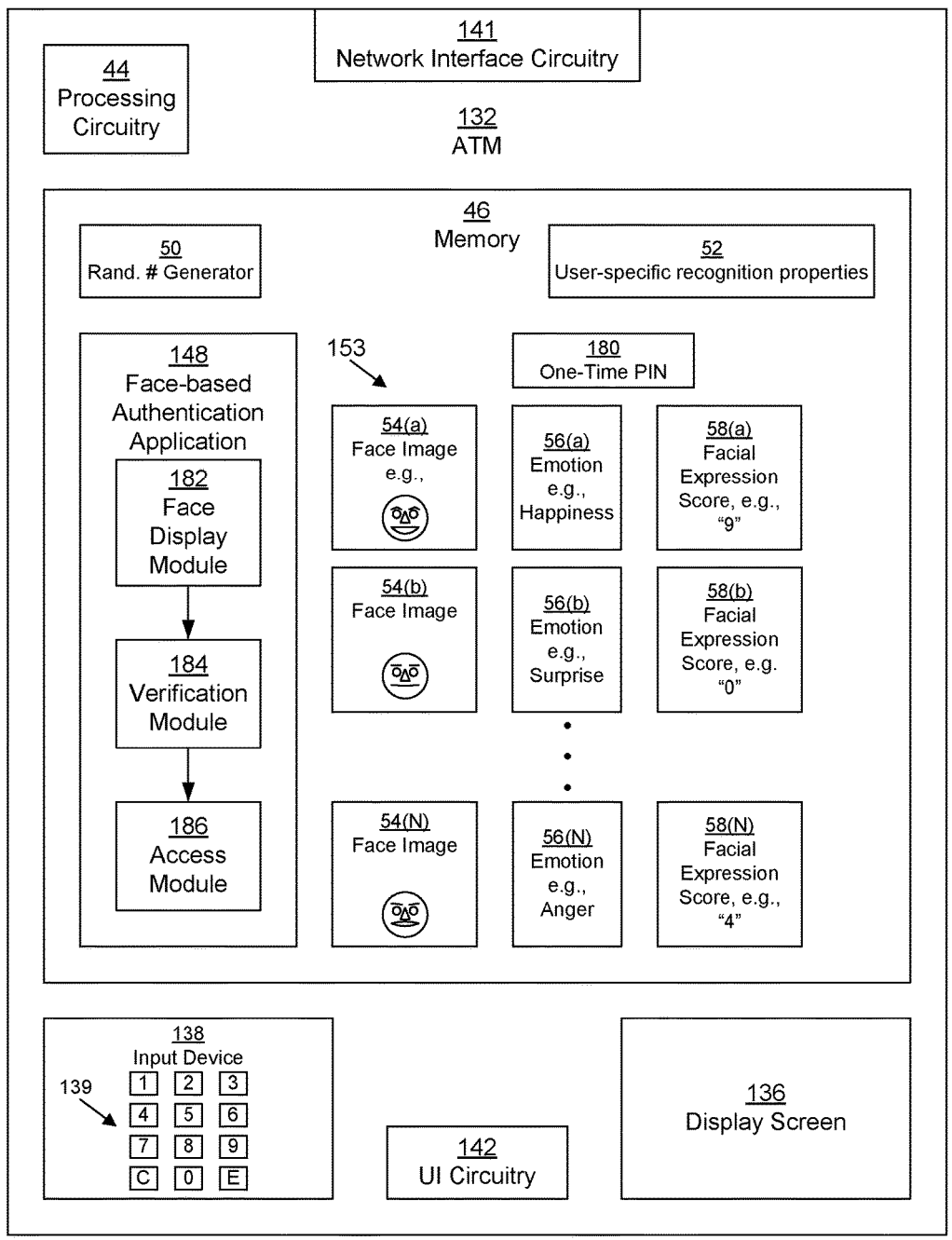
FIG. 2 is a block diagram depicting an example apparatus according to various embodiments.

FIG. 2 depicts an example automated teller machine (ATM) 132, which may be one embodiment of authentication device 32 in which the display device 36 and the input device 36 are embedded as display screen 136 and input device 138, respectively. As depicted, input device 138 is a keypad having keys 139 for different numerals (0-9) the user 40 can enter as well as a cancel key ("C") and an enter key ("E"). UI circuitry 142 connects to display screen 136 and input device 138. Network interface circuitry 141 connects to a network to remotely access a user's bank account as the protected resource 34.

Memory 46 of the ATM 132, in addition to storing the random number generator 50 and the user-specific recognition properties 52, also stores set 153, one-time PIN 180, and face-based authentication application 148, which is a particular embodiment of the face-based authentication application 48. Face-based authentication application 148 includes a face display module 182, a verification module 184, and an access module 186.

Face display module 182 creates set 153 and displays the face images 54 of the set 153 on display screen 136. Face display module 182 does this by using random number generator 50 to generate a random number as the one-time PIN 180 and then using the one-time PIN 180 and the user-specific recognition properties 52 to generate the set 153, which contains N entries—one for each digit of the one-time PIN 180. See below in connection with FIGS. 4A-5 for further details on the process of generating the face images 54. It should be understood that this is by way of example only; the one-time PIN 180 may also be divided into N numbers using other techniques, such as using modular arithmetic. Once face display module 182 creates the set 153 of N face images 54(*a*), 54(*b*), . . . , 54(N), it sends these face images 54(*a*), 54(*b*), . . . , 54(N) to the display screen 136 to be displayed either one-at-a-time or side-by-side, together with respective instructions 64 for each face image 54(*a*), 54(*b*), . . . , 54(N).

In an example scenario, N may be equal to five, and the one-time PIN 180 may be a 5-digit base-10 number. For example, the one-time PIN 180 may be 90234. Thus, as depicted, facial expression score 58(*a*) is 9, facial expression score 58(*b*) is 0, and facial expression score 58(N) is 4. Not depicted, facial expression score 58(*c*) is 2, and facial expression score 58(*d*) is 3. As depicted, emotion 56(*a*) is happiness, so face image 54(*a*) is an image file or bitmap depicting a happy face that the user 40 would be expected to rate as having a happiness score of 9 on a scale from 0 to 9. Another way of conceptualizing this is that face image 54(*a*) is constructed based on an activation of muscles or facial action units that the user 42 has associated with happiness. As depicted, emotion 56(*b*) is surprise, but since facial expression score 58(*b*) is 0, face image 54(*b*) is an image file or bitmap depicting a face that the user 40 would be expected to rate as having a surprise score of 0 on a scale from 0 to 9. Face image 54(*b*) may be a completely neutral face, but it may also be a face expressing a different emotion without any element of surprise. As depicted, emotion 56(N) is anger, so face image 54(N) is an image file or bitmap depicting a moderately angry face that the user 40 would be expected to rate as having an anger score of 4 on a scale from 0 to 9.

Verification module 184 is configured to receive the user-input rating score 76 from input device 138 via UI circuitry 142. For each face image 54 displayed on display screen 136, a separate rating score 76 will be received. If the face images 54(*a*), 54(*b*), . . . , 54(N) are displayed side-by-side, then verification module 184 may receive the N rating scores 76 one-after-another as if the user 40 were typing in a traditional PIN. Verification module 184 is then configured to determine whether or not the sequence of received rating scores 76 is equal to the one-time PIN 180 (which is equivalent to saying that the received rating scores 76 are equal to the facial expression scores 58(*a*), 58(*b*), . . . , 58(N) in succession).

Access module 186 is configured to selectively permit the user 40 to access the user bank account as the protected resource 34 depending whether or not the verification module 184 yielded an affirmative or negative result. Only if the verification module 184 yielded an affirmative result will the user 40 be permitted to access the bank account. Otherwise, access is denied.

Figure 3:
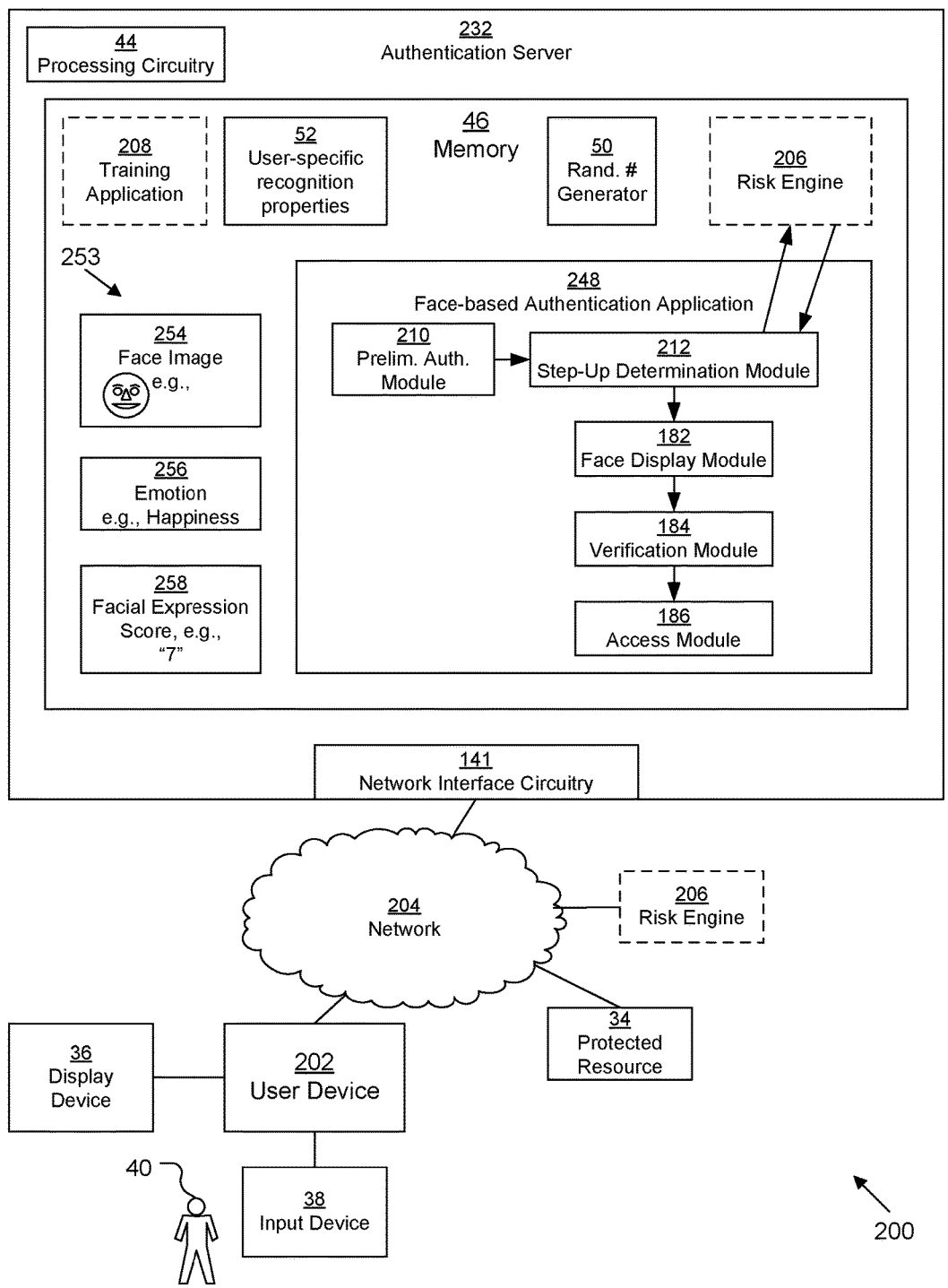
FIG. 3 is a block diagram depicting an example system for use in connection with various embodiments.

FIG. 3 depicts an example system 200 according to various embodiments. In system 200, the display device 36 and the input device 38 connect to a user device 202 which is remote from the authentication device 32, which, in this figure is embodied by authentication server 232. As depicted, user device 202, protected resource 34, authentication server 232, and, in some embodiments, risk engine 206, communicatively interconnect over network 204. Network 204 may be any kind of network, such as, for example, a local area network, a wide area network, the Internet, a storage area network, a fabric of interconnected hubs and switches, etc. In some embodiments, in lieu of a network, direct point-to-point connections may be used.

User device 202 may be any kind of computing device, such as, for example, a personal computer, a workstation, a server, an enterprise server, a smart phone, a tablet computer, a handheld computer, a laptop computer, a smart watch, a wearable computer, etc. Although authentication server 232 may also be any kind of computing device, typically it will be a server or an enterprise server.

Authentication server 232 includes network interface circuitry 141 as its UI/networking circuitry 42 for connecting to network 204. Authentication server 232 may also include UI circuitry (not depicted).

Memory 46 of the authentication server 232, in addition to storing the random number generator 50 and the user-specific recognition properties 52, also stores set 253, optional training application 208, optional risk engine 206, and face-based authentication application 248, which is a particular embodiment of the face-based authentication application 48. Face-based authentication application 248 includes a preliminary authentication module 210, a step-up determination module 212, face display module 182, verification module 184, and access module 186.

In some embodiments, risk engine 206 connects to network 204 as a hardware component, while in other embodiments, the risk engine 206 is a software component running on the authentication server 232.

Preliminary authentication module 210 operates to receive the authentication request 66 from the user device 202 over the network 204 via network interface circuitry 141, and to perform a preliminary authentication process in response. This is accomplished by the user 40 first using a preliminary authentication technique to log in to the authentication server 232 via preliminary authentication module 210 (e.g., using a username and password).

Certain information associated with the preliminary authentication is sent to the risk engine 206 (which may operate on the authentication server 32 or it may be a separate component on the network 204) by the step-up determination module 212. The risk engine 206 then returns a risk score, based on how risky the transaction appears to be (e.g., based on previous usage patterns and on how important the transaction is). Only if the risk score is above a certain threshold, indicating a very risky transaction does the face-based authentication application 248 perform face-based authentication. Step-up determination module 212 determines, based on the obtained risk score, whether to step-up the authentication (e.g., if the risk score exceeds a predetermined threshold). If step-up determination module 212 makes an affirmative decision to step-up the authentication, the face display module 182 is invoked.

Face display module 182 creates set 253, which, in certain embodiments may only have a single face image 254. Face display module 182 then displays the face image 254 of the set 253 on display device 36. Face display module 182 does this by using random number generator 50 to generate a random number to serve as the facial expression score 258 associated with the face image 254. Typically, the face display module 182 generates a value within a certain range (e.g., from 0 through 9) as the facial expression score 258. Face display module 182 also selects a random emotion to serve as emotion 256. Then, face display module 182 creates face image 254 by determining, with reference to user-specific recognition properties 52, what a face that the user 40 would rate as having the emotion 256 with the weight of facial expression score 258. See below in connection with FIGS. 4A-5 for further details on generating the face image 254.

In an example scenario as depicted, facial expression score 258 may be equal to 7, and the emotion 256 is happiness. Thus, face image 254 is an image file or bitmap depicting a moderately happy face that the user 40 would be expected to rate as having a happiness score of 7 on a scale from 0 to 9.

Verification module 184 is configured to receive the user-input rating score 76 from user device 202 via network circuitry 141. Verification module 184 is then configured to determine whether or not the received rating score 76 is equal to the facial expression score 258.

Access module 186 is configured to selectively permit the user 40 to access the protected resource 34 depending whether or not the verification module 184 yielded an affirmative or negative result. Only if the verification module 184 yielded an affirmative result will the user 40 be permitted to access the protected resource 34. Otherwise, access is denied.

In some embodiments, authentication server 232 may also run training application 208 in order to create the user-specific recognition properties 52 for each user 40. Thus, training application 208 causes various test face images to be displayed on display device 36, and it also receives feedback from the user 40 regarding how the user rates that face image for one or more emotions, which allows the training application to build the user-specific recognition properties 52 for that user 40. In some embodiments, training application 208 may continue to operate in the background, updating the user-specific recognition properties 52 for each user 40 as the users 40 interact with the authentication server 32 on a regular basis. Although depicted only on authentication server 232, it should be understood that training application 208 may run on any computing device with access to the user-specific recognition properties 52 stored on the authentication device 32 for a user 40.

There are various ways to create images of faces based on photographs having known expressions. Several such techniques are described in "Synthesizing Realistic Facial Expressions from Photographs," by Frederic Pighin, et al., published by the Association for Computing Machinery, Inc. on pages 75-84 of the SIGGRAPH '98 journal (1998). Thus, 3-dimensional face models can be created which can be morphed together and then rendered to create images of faces.

Figure 4A:
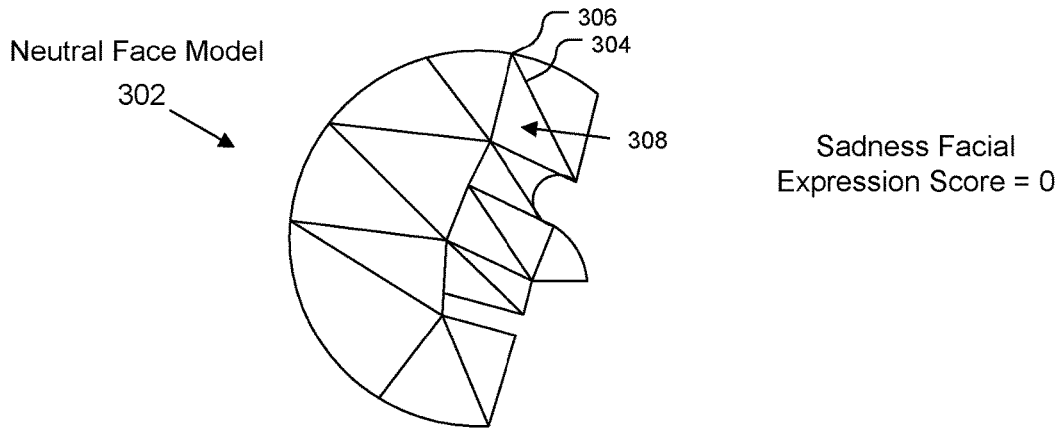
FIGS. 4A-4C are block diagrams depicting a set of example face models for use in connection with various embodiments.
Figure 4B:
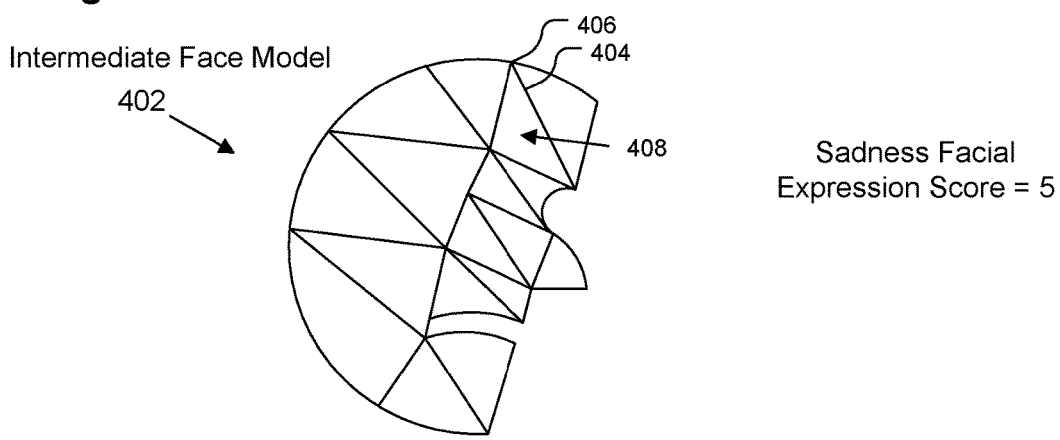
Figure 4C:
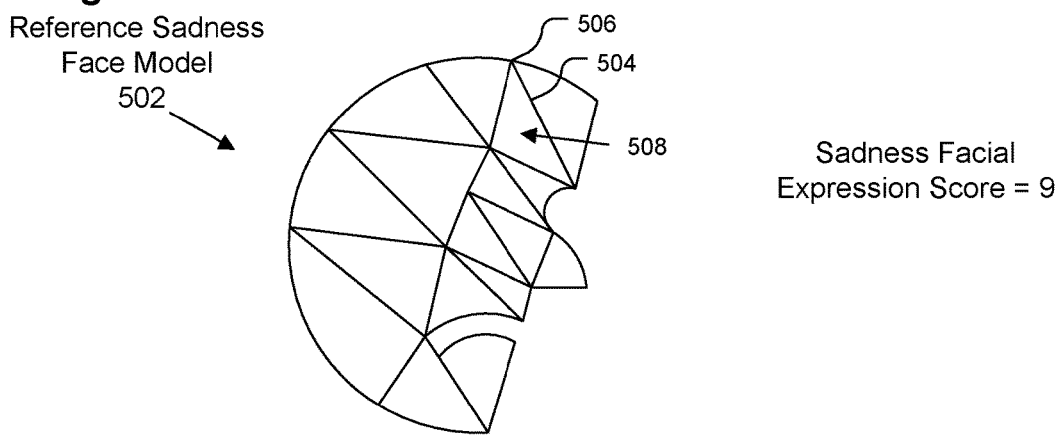
Figure 5:
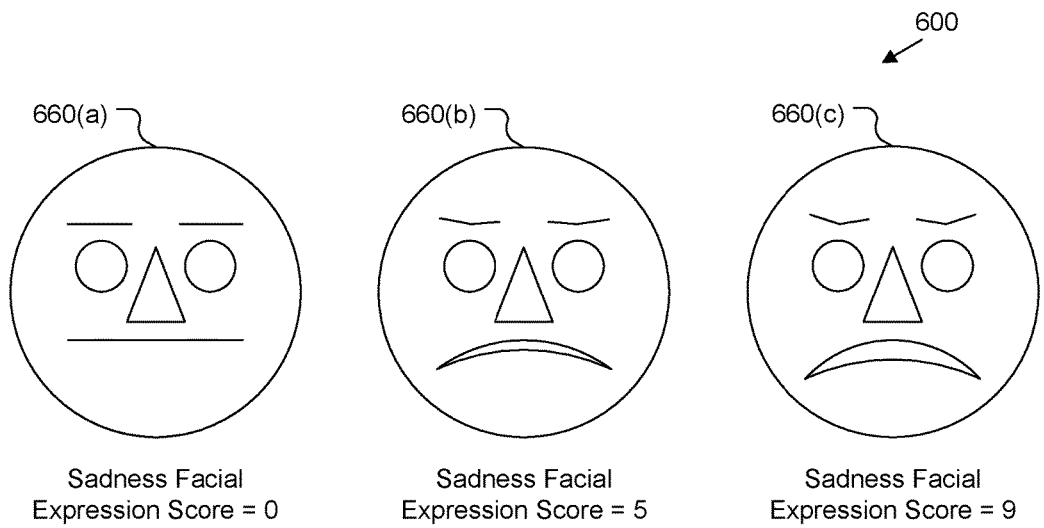
FIG. 5 is a block diagram depicting a set of example face images for use in connection with various embodiments.

FIGS. 4A-4C depict example underlying data 3-dimensional structures used by face-based authentication application 48 to create face images 54. In particular, FIG. 4A depicts an example neutral face model 302, which may be used to generate a neutral face image 660(*a*) found within a sadness spectrum 600 depicted in FIG. 5. FIG. 4C depicts an example reference sadness face model 502, which may be used to generate a fully sad face image 660(*c*) found within the sadness spectrum 600 of FIG. 5. FIG. 4B depicts an example intermediate sadness face model 402, which may be used to generate a moderately sad face image 660(*b*) found within the sadness spectrum 600 of FIG. 5.

User-specific recognition properties 52 may include a neutral face model 302 defined by an ideal neutral facial expression perceived by user 40. User-specific recognition properties 52 may also include various reference face models (e.g., reference sadness face model 502) for various emotions (e.g., sadness). Typically, a reference face model indicates an idealized version of how a particular emotion at maximum intensity manifests itself in the perception of a user 40. Thus, reference sadness face model 502 may have been scored by the user 40 as having a maximum sadness score of 9 on a scale from 0 to 9. Typically, a reference face model also includes only a single emotion. However, in some embodiments, some reference face models may depict combinations of emotions to illustrate how the user 40 perceives combinations of emotions. In addition, in some embodiments, some reference face models may depict faces with non-maximal emotions to aid in making a proper interpolation between a neutral expression and a maximal emotion. Another embodiment may include prompting the user 40 to provide a score 258 on a certain emotion 256 regardless of the emotion used to create the displayed facial expression image 254, such as displaying a "happy" face and asking the user 40 to rank how "sad" the face appears.

Neutral face model 302 is based on a frame defined by a set of polygons 304 (e.g., triangles), which, in turn are defined by sets of vertices 306. Each polygon 304 may also have a texture map 308 applied to it. It should be understood that as a face model transitions from the neutral expression of neutral face model 302 to the moderately sad (with a sadness facial expression score of 5) expression of intermediate face model 402, the positions of vertices 306 shift to the positions of vertices 406, and these positions shift even further to the positions of vertices 506 as the face model transitions to the fully sad expression of reference sadness face model 502. Thus, the polygons deform in shape and position between neutral polygons 304, moderately sad polygons 404, and fully sad polygons 504. Similarly, the appearance of the texture maps deform in shape and position between neutral texture maps 308, moderately sad texture maps 408, and fully sad texture maps 508. Thus, when rendered using 3-dimensional graphics techniques, neutral face model 302 yields a neutral face image 660(*a*) having an expected sadness facial expression score of 0, intermediate face model 402 yields an intermediate face image 660(*b*) having an expected sadness facial expression score of 5, and reference sadness face model 502 yields a fully sad face image 660(*c*) having an expected sadness facial expression score of 9.

In some embodiments, in order the various face models 302, 402, 502 for various facial expression scores of a particular emotion may be further morphed to various degrees with other emotions in order to make it unlikely for an attacker to be able to simply re-use a score intercepted from the user 40 in regards to a prior face image 60 that is identical to the current face image 60.

In some embodiments, instead of, or in addition to, using the polygon models of FIGS. 4A-4C, the Facial Action Coding System (FACS) or a similar system may be used to establish which action units (each comprising a muscle or group of muscles of the face) are activated to what degree of intensity for various facial expressions. FACS is described in P. Ekman and W. Friesen, "Facial Action Coding System: A Technique for the Measurement of Facial Movement," published by Consulting Psychologists Press, Palo Alto, 1978. In addition, the ARTNATOMY system at www[dot]artnatomia[dot]net/uk/index[dot]html and the CANDIDE system at www[dot]bk[dot]isy[dot]liu[dot]se/candide can be used to model the structures underlying various facial expressions and to render images based on those models.

Figure 6:
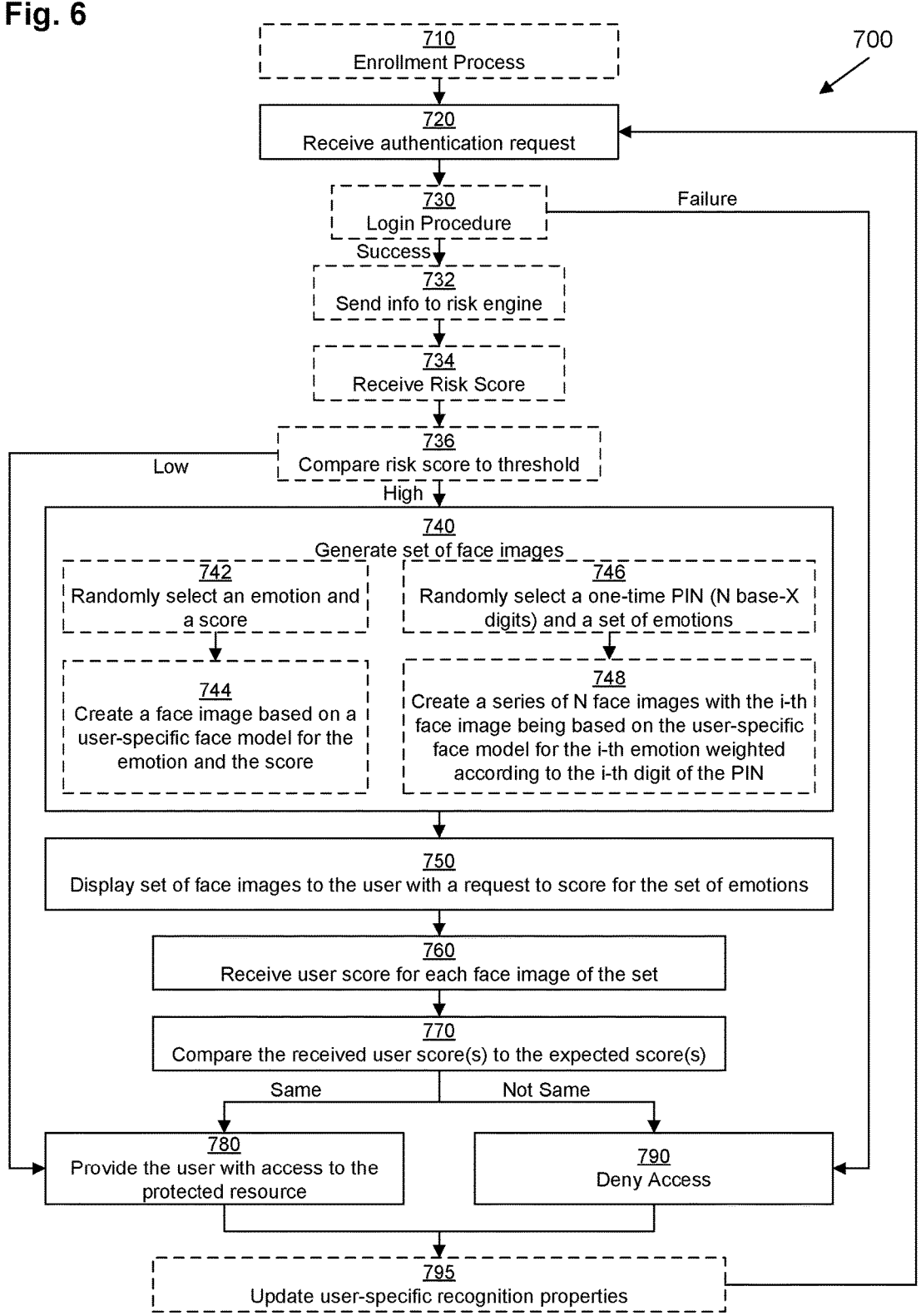
FIG. 6 is a flowchart depicting an example method according to various embodiments.

FIG. 6 depicts an example method 700 according to various embodiments performed by face-based authentication application 48 and/or training application 208 of authentication device 32 for selectively providing access to a protected resource 34. It should be understood that any time a piece of software, such as, for example, face-based authentication application 48, 148, 248, risk engine 206 (in embodiments in which it is software), random number generator 50, training application 208, preliminary authentication module 210, step-up determination module 212, face display module 182, verification module 184, access module 186, etc., is described as performing a method, process, step, or function, in actuality what is meant is that a computing device (e.g., authentication server 32) on which that piece of software is running performs the method, process, step, or function when executing that piece of software on its processor (e.g., processing circuitry 44). It should be understood that, within FIG. 6, steps 710, 730-736, and 795 are dashed because they may be ancillary or optional to method 700. It should be understood that, within FIG. 6, sub-steps 742-748 are dashed because they represent particular alternate example implementations of step 740, although other implementations may be used instead.

Preliminarily, in step 710, in some embodiments, training application 208 performs an enrollment process, in which the user-specific recognition properties 52 for a particular user 40 are stored on the authentication device 52. This enrollment process may include presenting various face images 60 on a display device 36 together with a request for the user 40 to rate that face image 60 with respect to its portrayal of one or more emotions. This allows the training application 208 to create both a user-specific neutral face model 302 and a set of user-specific reference face models (e.g., reference sadness face model 502) for particular emotions, and, in some embodiments, combinations of emotions. Training application 208 can then store the user-specific neutral face model 302 and the set of user-specific reference face models as the user-specific recognition properties 52. In embodiments in which the set of user-specific reference face models includes user-specific reference face models for non-maximal emotions in addition to user-specific reference face models for just maximal emotions, training application 208 may also store a notation of the particular emotion(s) and respective facial expression score(s) for that or those emotions in connection with each user-specific reference face model stored within user-specific recognition properties 52.

In step 720, face-based authentication application 48 receives an authentication request 66 from the user. In some embodiments (e.g., in the case of example face-based authentication application 148 running on an ATM 132), operation proceeds directly with step 740, while in others (e.g., in the case of example face-based authentication application 248 running on an authentication server 232), a preliminary login procedure is performed first, in which case operation proceeds with optional step 730.

In optional step 730, preliminary authentication module 210 engages in a preliminary login procedure with the user 40 over the network 204. This allows the user 40 to supply his username and password to be verified by the authentication server 232. If the preliminary login procedure fails, then operation proceeds with step 790, denying access to the protected resource 34. If it succeeds, however, operation proceeds with optional step 732.

In optional step 732, step-up determination module 212 sends information about the preliminary login procedure to the risk engine 206. This information may include, for example, the location and/or IP address from which the user 40 logged in, the speed at which the user 40 responded to the login inquiry, the time at which the preliminary login procedure occurred, whether there were any failed login attempts prior to the successful login, etc. When the risk engine 206 receives the information from step 732, it analyzes the received information in conjunction with other information that risk engine 206 stores about the user 40 and previous login attempts. This analysis may be performed according to the Adaptive Authentication technique utilized by the EMC Corp. of Hopkinton, Mass. The analysis yields a risk score, which is sent back to the step-up determination module 212 of the authentication device 32.

Subsequently, once the risk engine 206 calculates the risk score, in optional step 734, the step-up determination module 212 receives the risk score. Then, in optional step 736, the step-up determination module 212 compares the risk score to a pre-set threshold. The threshold may be selected in advance, typically by a system administrator, or determined dynamically by the system, to reflect a maximum acceptable risk for transactions to proceeds without step-up authentication according to various embodiments. If the risk score is lower than the threshold (or in certain embodiments, less than or equal to the threshold), then operation may proceed directly with step 780 in which access to the protected resource 34 is immediately granted. However, if the risk score is higher than the threshold (or in certain embodiments, greater than or equal to the threshold), then operation may proceed with step 740.

In step 740, face display module 182 generates a set 53 of face images 54 with respective facial expression scores 58 for respective emotions 56.

In some embodiments (e.g., in the case of example face-based authentication application 248 running on an authentication server 232), step 740 involves a set 253 having only a single face image 254 with its associated emotion 256 and facial expression score 258. Thus, in sub-step 742, face display module 182, with the aid of random number generator 50, randomly selects an emotion from a set of available emotions (e.g., happiness, amusement, anger, surprise, sadness, sleepiness) to be stored as emotion 256 and also randomly selects a score within a defined range (e.g., in the range of 0 through 7 or 0 through 9) to be stored as facial expression score 258. In some embodiments, compound emotions that are known to be linear combinations of simple emotions may also be used. Then, in sub-step 744, face display module 182 applies face generation techniques to generate and store a face image 254 based on the emotion 256, the facial expression score 258, and the user-specific recognition properties 52. This may involve morphing between the neutral face model 302 from the user-specific recognition properties 52 and a reference face model associated with the emotion 256 from the user-specific recognition properties 52 using a weighting factor defined by the facial expression score 258.

In other embodiments (e.g., in the case of example face-based authentication application 148 running on an ATM 132), step 740 involves a set 153 having an integer, N, face images 54(a), 54(b), . . . , 54(N), each with its associated emotion 56(a), 56(b), . . . , 56(N) and facial expression score 58(a), 58(b), . . . , 58(N). Thus, in sub-step 746, face display module 182, with the aid of random number generator 50, randomly selects a series of emotions from a set of available emotions (e.g., happiness, amusement, anger, surprise, sadness, sleepiness) to be stored as emotions 56(a), 56(b), . . . , 56(N) and also randomly selects a one-tine PIN 180. In some embodiments, compound emotions that are known to be linear combinations of simple emotions may also be used. Face display module 182 is then able to predictably generate a series of facial expression scores 58(*a*), 58(*b*), . . . , 58(N) from the generated one-tine PIN 180. In a typical embodiment, the series of facial expression scores 58(*a*), 58(*b*), . . . , 58(N) are generated by taking N successive digits of the representation of the generated one-tine PIN 180 in a given base X (e.g., base 10). Then, in sub-step 748, face display module 182 applies face generation techniques to generate and store a series of face images 54(*a*), 54(*b*), . . . , 54(N) based on the emotions 56(*a*), 56(*b*), . . . , 56(N), the series of facial expression scores 58(*a*), 58(*b*), . . . , 58(N), and the user-specific recognition properties 52. For each face image 54(*i*), this may involve morphing between the neutral face model 302 from the user-specific recognition properties 52 and a reference face model associated with the respective emotion 56(*i*) from the user-specific recognition properties 52 using a weighting factor defined by the respective facial expression score 58(*i*).

In step 750, face display module 182 causes the set 53 of one or more face images 54 to be displayed to the user 40 as one or more face images 60 on display screen 36, each together with a respective instruction 64 asking the user 40 rate the displayed face image 60 with respect to the respective emotion 56. In some embodiments, when there is more than one face image 54 in the set 53, the various face images 54(*a*), 54(*b*), . . . , 54(N) are displayed side-by-side or in another convenient ordered layout on the display device 36, each together with its respective instruction 64. In other embodiments, when there is more than one face image 54 in the set 53, step 750 is interleaved with step 760, so the various face images 54(*a*), 54(*b*), . . . , 54(N) are displayed sequentially one-after-another together with their respective instructions 64, the display device 36 changing between the sequential face images 54(*a*), 54(*b*), . . . , 54(N) upon the user 40 entering each user score (see step 760).

In step 760, face display module 182 receives a respective user score 76 for each face image 54 of the set 53. In some embodiments (see above), step 760 may be interleaved with step 750.

In step 770, verification module 184 compares the user score(s) 76 for each face image 54 of the set 53 to the respective facial expression score 58 for that face image 54. If there is complete agreement (e.g., in the case of set 253, the one received user score 76 matches the facial expression score 258, or, in the case of set 153, each received user score 76 for face image 54(*i*) matches the respective facial expression score 58(*i*)), then operation proceeds with step 780. Otherwise, operation proceeds with step 790.

In step 780, access module 186 provides the user 40 with access to the protected resource 34.

In step 790, access module 186 denies access to the protected resource 34 to the user 40.

Finally, in optional step 795, training application 208 receives the result of whether the user 40 correctly identified the facial expression scores 58 of the face images 54 of the set 53, and based on other factors indicative of whether the user 40 appeared to be legitimate, the training application 208 updates the user-specific recognition properties 52 to better reflect the evaluation skills of the user 40. Operation can then proceed again back with step 720 upon receiving another authentication request 66.

Thus, embodiments have been described for selectively providing access to a protected resource 34.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method performed by a computing device of providing access to a protected resource, the method comprising:
    receiving, by the computing device, an authentication request from a user seeking access to the protected resource;
    in response to receiving the authentication request, generating a set of one or more face images, each face image of the set of face images having a facial expression score for a particular emotion associated with that face image, the facial expression scores being specific to the user;
    displaying each face image of the set of face images to the user together with a request for the user to score that face image for the particular emotion associated with that face image;
    in response to displaying each face image, receiving a user score for that face image;
    comparing the received user score for each face image of the set of face images to the respective facial expression score for the particular emotion associated with that face image, yielding a set of comparison results; and
    selectively providing access to the protected resource in response to each of the comparison results being affirmative.

2. The method of claim 1 wherein:
    the set of face images includes a plurality of face images; and
    generating the set of one or more face images includes:
        selecting a random number and a random set of emotions, the random set of emotions having the plurality of elements; and
        creating each face image of the set of face images includes, for each face image of the set of face images, creating the face image with a facial expression score derived from the random number for a corresponding emotion from the random set of emotions.

3. The method of claim 2 wherein:
the random number is an N digit number in base X, each digit ranging between 0 and X−1;
the plurality is equal to N; and
for each face image of the set of face images, creating the face image with the facial expression score derived from the random number for the corresponding emotion from the random set of emotions includes, for each integer, i, from 1 to N, creating an i-th face image of the set of face images, the i-th face image having a facial expression score for an i-th emotion of the set of emotions equal to the i-th digit of the random number.

4. The method of claim 3 wherein creating the i-th face image of the set of face images, the i-th face image having the facial expression score for the i-th emotion of the set of emotions equal to the i-th digit of the random number, includes 3-dimensionally morphing a 3-dimensional neutral face model with a 3-dimensional model of a face having the i-th emotion of the set of emotions as evaluated by the user, the 3-dimensionally morphing proceeding to a degree defined by the i-th digit of the random number, the 3-dimensional morphing including morphing of polygon vertices and texture maps applied to polygons defined by the polygon vertices.

5. The method of claim 3 wherein:
the computing device is an automated teller machine (ATM) having an embedded display screen and an embedded keypad;
displaying each face image of the set of face images to the user includes displaying each face image to the user on the embedded display screen of the ATM;
receiving the user score for each face image includes receiving the user score from the user for each face image via the user hitting a key of the embedded keypad of the ATM corresponding to a value in the range of 0 to X−1; and
providing access to the protected resource includes providing the user with access to a bank account of the user.

6. The method of claim 1 wherein:
the method further comprises, in response to receiving the authentication request:
performing, by the computing device, a password-based login procedure;
upon successfully performing the password-based login procedure, sending, by the computing device, information associated with the password-based login procedure to a risk analysis engine; and
in response, receiving, by the computing device from the risk analysis engine, a risk score associated with the password-based login procedure; and
generating the set of one or more face images is performed by the computing device in response to receiving the risk score from the risk analysis engine, the risk score being above a threshold value.

7. The method of claim 6 wherein:
receiving the authentication request includes receiving the authentication request from a remote user device across a network;
performing the password-based login procedure includes communicating with the remote user device across the network;
displaying each face image of the set of face images to the user includes sending each face image of the set of face images to the remote user device across the network for display to the user; and receiving the user score for each face image includes receiving the user score for each face image across the network from the remote user device.

8. The method of claim 1 wherein:
the method further comprises, prior to receiving the authentication request, engaging in an enrollment process for the user, the enrollment process including:
displaying a plurality of test face images to the user;
for each test face image of the plurality of test face images, receiving, from the user, a facial expression score for a particular emotion; and
deriving a set of user-specific recognition properties based on the facial expression scores received in response to displaying the plurality of test face images to the user; and
generating the set of one or more face images, each face image of the set of face images having the facial expression score for the particular emotion associated with that face image, the facial expression scores being specific to the user, includes referencing the derived set of user-specific recognition properties.

9. The method of claim 8 wherein:
deriving the set of user-specific recognition properties based on the facial expression scores received in response to displaying the plurality of test face images to the user includes storing a plurality of 3-dimensional reference models corresponding to a subset of the plurality of test face images, each 3-dimensional reference model being stored in association with a facial expression score for one or more particular emotions received from the user with respect to a test face image generated from that 3-dimensional reference mode, each 3-dimensional reference model including a set of polygons, each polygon including a set of vertices and a texture map; and
generating the set of one or more face images including referencing the derived set of user-specific recognition properties includes:
performing a weighted 3-dimensional morphing operation between a 3-dimensional neutral face model and a 3-dimensional reference model of a face stored in association with a facial expression score received from the user for the particular emotion to yield a resulting 3-dimensional model, the weighted 3-dimensional morphing operation including morphing of the set of the vertices and texture maps of each polygon from the 3-dimensional neutral face model to the 3-dimensional reference model using the facial expression score as a weight; and
rendering the resulting 3-dimensional model using 3-dimensional graphical rendering.

10. The method of claim 8 wherein the method further comprises modifying the set of user-specific recognition properties based on user feedback from continued use of the user-specific recognition properties for authentication purposes.

11. A computer program product comprising a non-transitory computer-readable storage medium storing a set of instructions, which, when performed by a computing device, cause the computing device to provide access to a protected resource by:
receiving, by the computing device, an authentication request from a user seeking access to the protected resource;
in response to receiving the authentication request, generating a set of one or more face images, each face image of the set of face images having a facial expression score for a particular emotion associated with that face image, the facial expression scores being specific to the user;

displaying each face image of the set of face images to the user together with a request for the user to score that face image for the particular emotion associated with that face image;

in response to displaying each face image, receiving a user score for that face image;

comparing the received user score for each face image of the set of face images to the respective facial expression score for the particular emotion associated with that face image, yielding a set of comparison results; and selectively providing access to the protected resource in response to each of the comparison results being affirmative.

12. An apparatus comprising memory coupled to processing circuitry configured to provide access to a protected resource by:

receiving, by the apparatus, an authentication request from a user seeking access to the protected resource;

in response to receiving the authentication request, generating a set of one or more face images, each face image of the set of face images having a facial expression score for a particular emotion associated with that face image, the facial expression scores being specific to the user;

displaying each face image of the set of face images to the user together with a request for the user to score that face image for the particular emotion associated with that face image;

in response to displaying each face image, receiving a user score for that face image;

comparing the received user score for each face image of the set of face images to the respective facial expression score for the particular emotion associated with that face image, yielding a set of comparison results; and selectively providing access to the protected resource in response to each of the comparison results being affirmative.

\* \* \* \* \*